Figure 1:
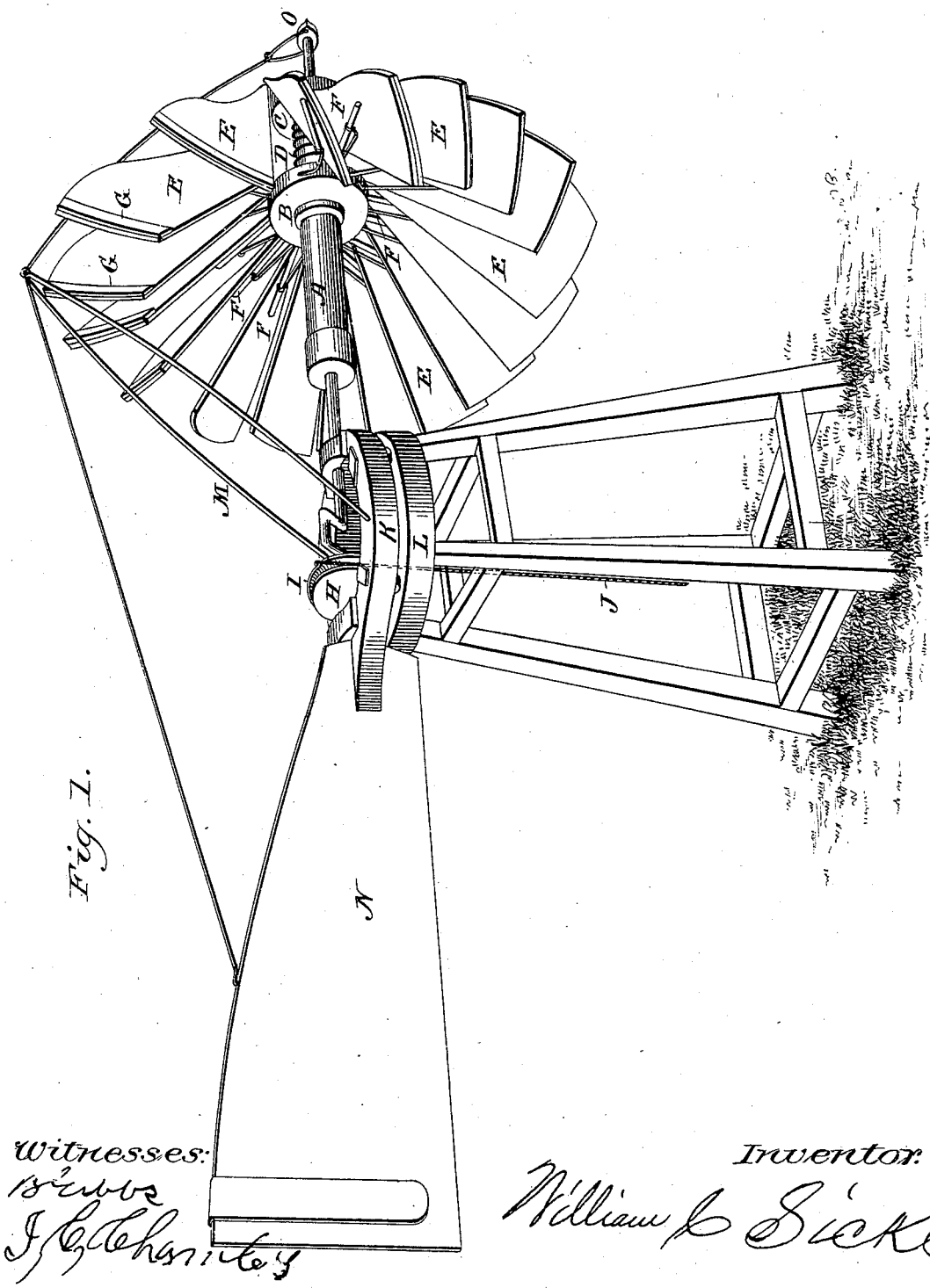

(Model.)

W. C. SICKLES.
WINDMILL.

No. 279,194. Patented June 12, 1883.

Witnesses:

Inventor:
William C. Sickles

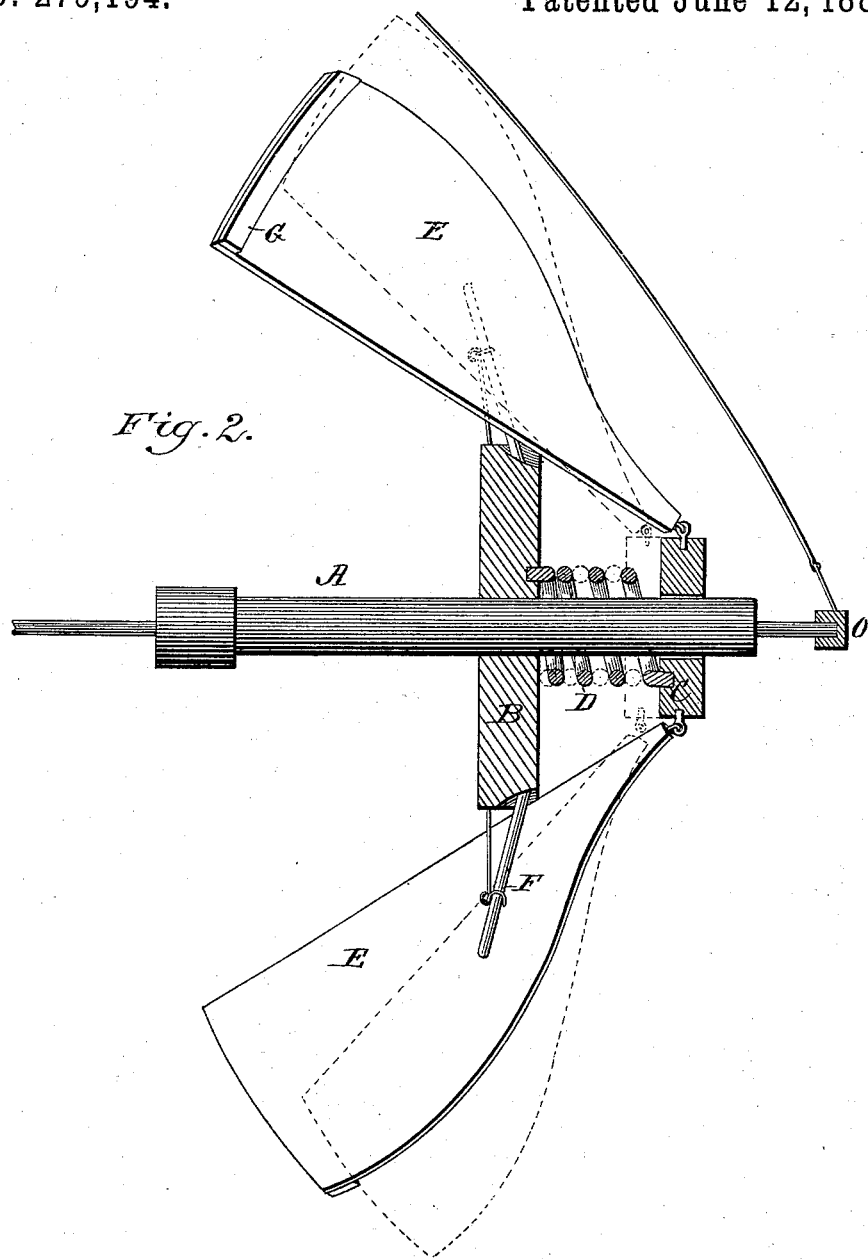

UNITED STATES PATENT OFFICE.

WILLIAM C. SICKLES, OF DALLAS, TEXAS.

WINDMILL.

SPECIFICATION forming part of Letters Patent No. 279,194, dated June 12, 1883.

Application filed September 14, 1882. (Model.)

*To all whom it may concern:*

Be it known that I, WILLIAM C. SICKLES, of Dallas, in the county of Dallas and State of Texas, have invented a new and useful Improvement in Wind and Water Wheels, of which the following is a full, clear, and exact description, reference being had to the annexed drawings, forming part of this specification.

This invention relates to wheels for utilizing wind or water power; and the invention consists of the novel construction hereinafter described and claimed.

In the drawings, Figure 1 is a perspective view of my invention, and Fig. 2 is a detail view.

A indicates the wheel-shaft, having a stationary collar, B, and a loose collar, C, of smaller diameter than the collar B, arranged thereon near its forward end. Between the two collars, and secured thereto, is a spiral spring, D, which surrounds the shaft, and is adapted to give a slight rotary movement to the loose collar when it is elongated or compressed. To the peripheries of the two collars are flexibly connected a series of blades, E, of gradually-increasing width from their forward to their rear ends, which are arranged approximately in the form of the cone and obliquely with respect to the shaft. The blades are hinged upon nearly radial arms F, attached to the periphery of the stationary collar, so that in a strong wind they may oscillate toward a feathering position, and thus lessen the resistance they offer to the wind in proportion to the strength of the latter. Thus in a gale the blades will completely feather, so as to present only their ends and edges to the wind. When the blades are thus made to feather, the loose collar, to which their forward ends are attached, will be thrown forward along the shaft A against the tension of the spiral spring D, which is partially uncoiled at the same time it is elongated, and consequently when the resistance of the wind decreases, by a change of velocity, the action of the spring will move the blades to or toward their normal position, in which they will present one side to the wind, and thereby be caused to rotate. The blades are provided with one or more cross-ribs, G, to increase their power of resistance to the wind. The shaft A is provided with a friction-roller, H, over which is curved a spring-bar, I, which is adapted to be drawn down into contact with the roller by means of a cord or rod, J, when it desired to check or stop the wheel. This roller is arranged within the rim of the turn-table K, which is adapted to rotate upon the tower L. The turn-table is provided with a standard, M, to which is connected a cable-wire having one end attached to the vane N and the other to a bearing, O, in which the forward end of the shaft A rests and rotates. This construction serves the purpose of keeping the wheel and vane evenly supported and preventing an unequal distribution of friction.

Having thus described my invention, what I claim as new, and desire to secure by Letters Patent, is—

1. The combination, with the shaft having a collar rigidly secured thereto, and a loose collar of slightly smaller diameter mounted on the shaft in front of the fixed collar, and connected to the latter by a coil-spring surrounding the shaft, of a series of long blades having their forward ends flexibly secured to the loose collar, and their central portions pivoted transversely upon rods which are secured to the fixed collar, substantially as shown and described.

2. The combination, with the shaft, the vane, and the turn-table, of the standard secured to the turn-table, and the cable-wire connected at one end to the vane, and having the other end passed over the wheel and secured to a bearing in which rests the end of the shaft, substantially as shown and described.

WM. C. SICKLES.

Witnesses:
  BARNETT GIBBS,
  EUGENE LEVI.